JOSEPH E. REYNOLDS JR.-INVENTORS
ALOYSIUS J. KELLY
RICHARD H. PERKINS
BERT W. CROW

BY

ATTORNEY

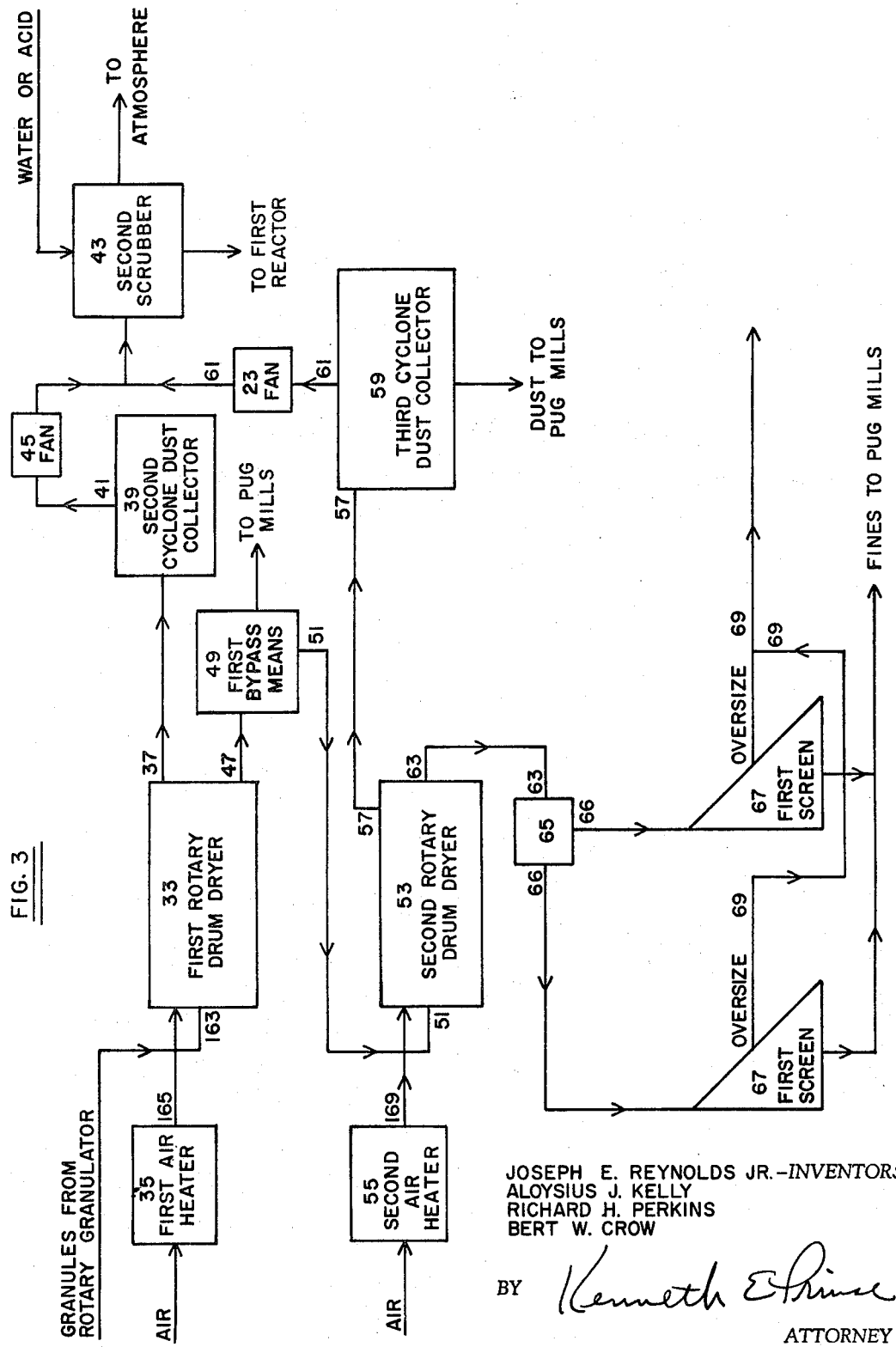

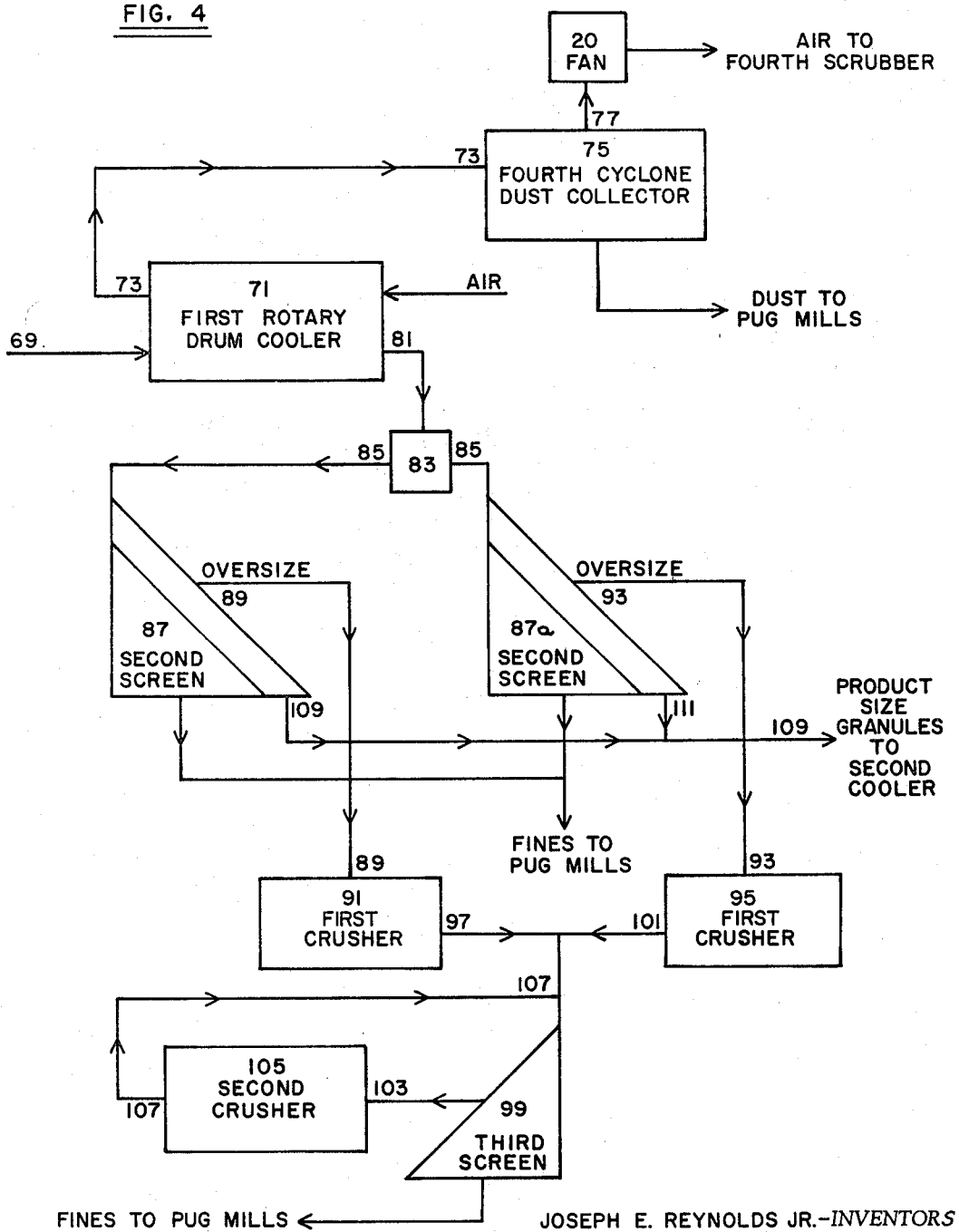

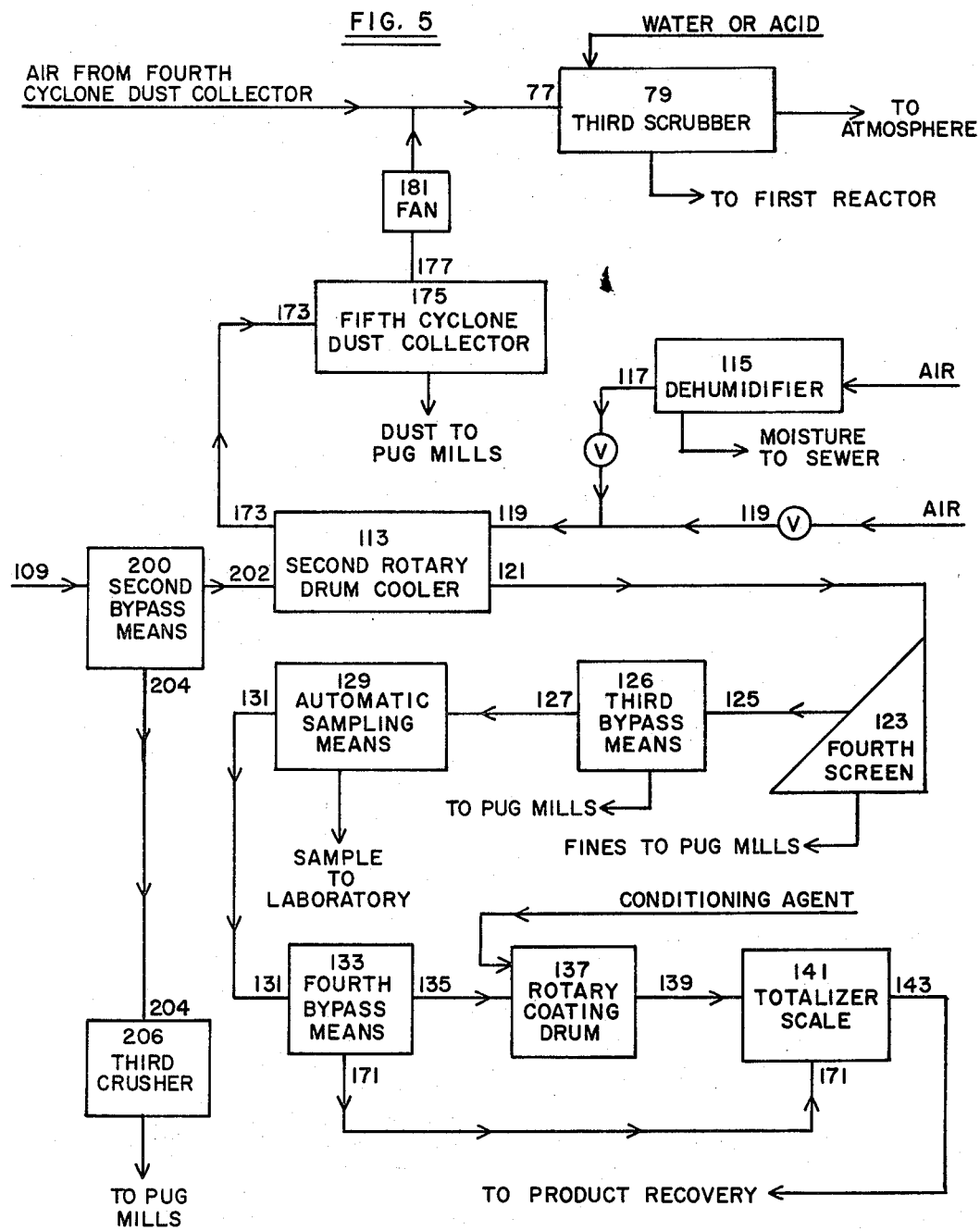

United States Patent Office

3,384,470
Patented May 21, 1968

3,384,470
CONTINUOUS MULTISTEP PROCESS FOR PREPARING GRANULAR MIXED FERTILIZERS
Joseph E. Reynolds, Jr., Aloysius J. Kelly, and Richard H. Perkins, Towson, Md., and Bert W. Crow, Joplin, Mo., assignors to W. R. Grace & Co., New York, N.Y., a corporation of Connecticut
Filed Nov. 9, 1966, Ser. No. 593,195
3 Claims. (Cl. 71—35)

ABSTRACT OF THE DISCLOSURE

In abstract, a process for mixing and granulating fertilizer ingredients. The ingredients are slurried, granulated, smoothed, dried, and screened in such a way as to continuously produce product granules of uniform particle size, while concurrently recycling fines and crushed oversize particles.

Figure 1:
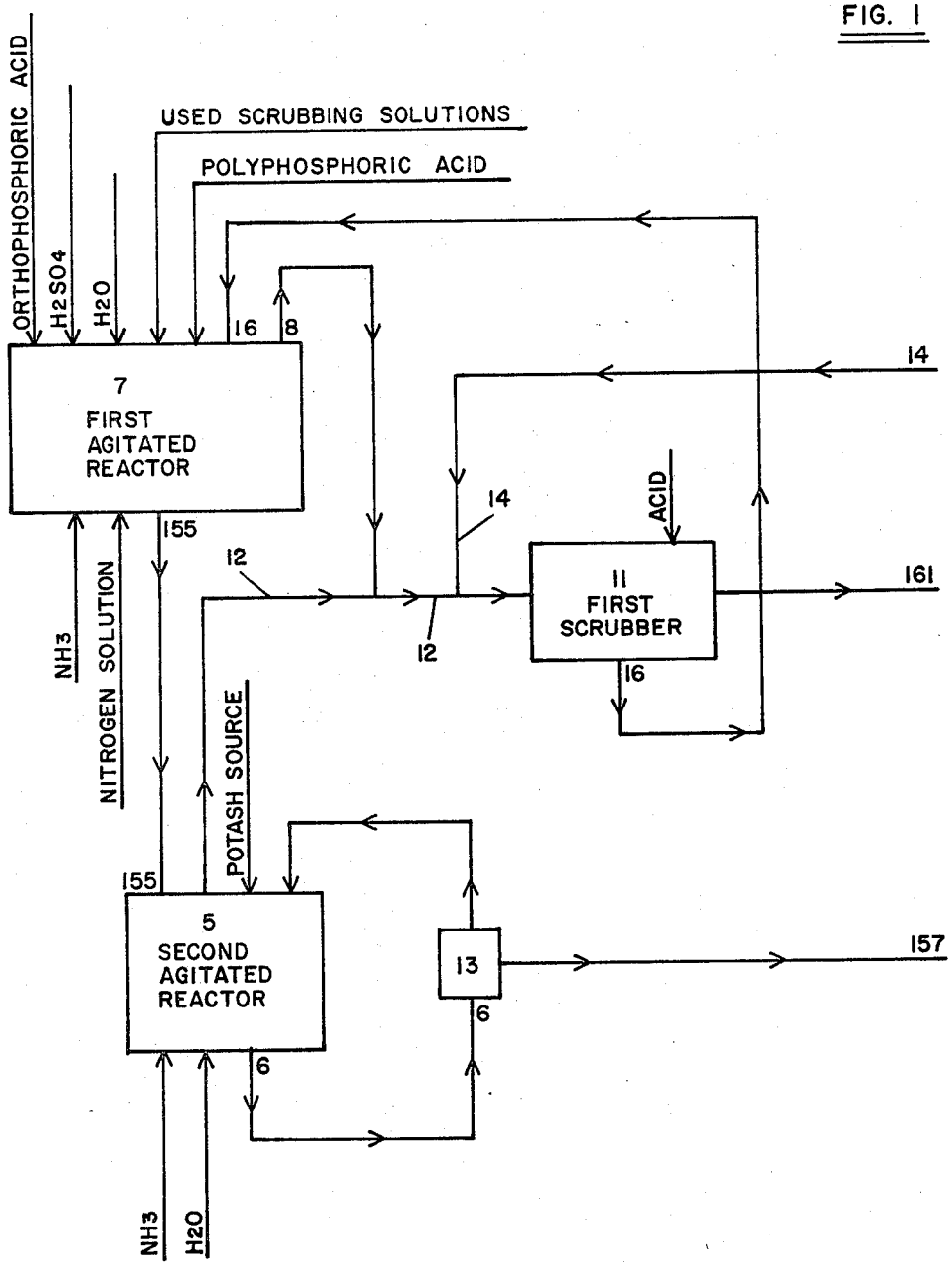
Figure 2:
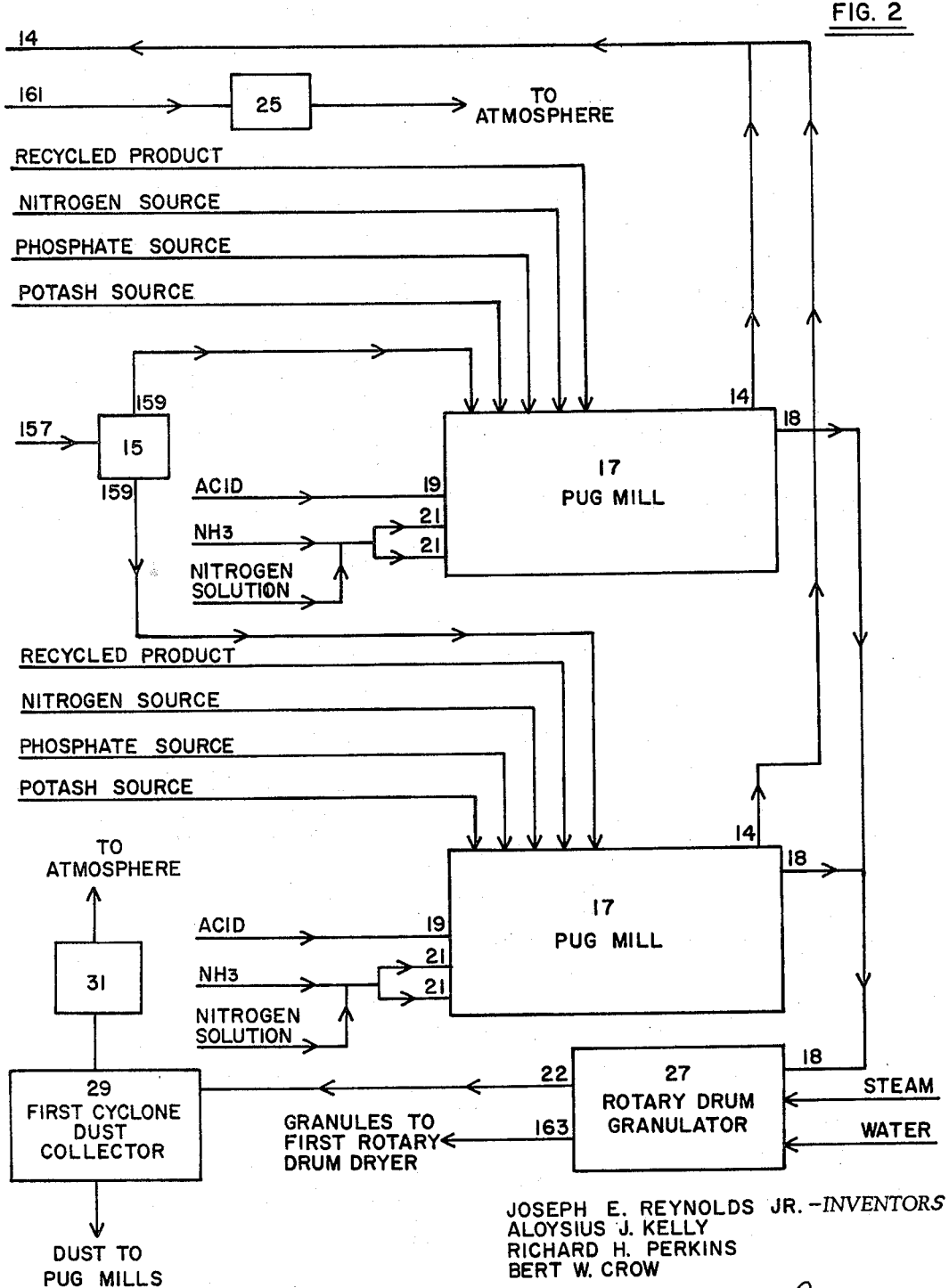

This invention relates to fertilizer. More particularly, it relates to a continuous multistep process for producing granular mixed fertilizer.

In summary, this invention is directed to a continuous multistep process for producing granular mixed fertilizer having ammonium phosphate as a phosphatic component which comprises: continuously introducing a slurry of ammonium phasphate having an atomic ratio of N:P of about 1.2–1.5 and a moisture content of about 15–30%, a potash source selected from the group consisting of potassium chloride, potassium nitrate, potassium sulfate, potassium orthophosphate, potassium polyphosphates, and mixtures thereof, and a substantial portion of particles recycled from later mentioned sizing and crushing steps into the upstream end, or portion, or part, of a pug mill; continuously withdrawing granular material from the downstream end of the pug mill; continuously passing said material into the upstream end of a rotating granulator where the granular material is smoothed by rotating in the presence of steam and hot water, thereby to produce smooth granules; continuously withdrawing the resulting smooth granules from the downstream end of the granulator; continuously passing these granules into the upstream end of a first rotary drum drier where the granules are dried by rotating in the presence of a stream of air having an inlet temperature of about 300–800° F.; continuously removing the granules from the downstream end of the first drier and continuously passing the granules into the upstream end of a second rotary drier where the granules are further dried by rotating in the presence of a stream of air having an inlet temperature of about 200–500° F.; continuously removing the thus dried granules from the downstream end of the second rotary drier; continuously passing the thus dried granules to a first screen having a single deck with about a 10–14 mesh screen therein; continuously screening said granules to obtain a first portion of fine particles which pass about a 10–14 mesh screen and a first portion of oversize granular particles which are retained on about a 10–14 mesh screen; continuously recycling the thus obtained first portion of fine particles to the pug mill; continuously passing the first portion of oversize granular particles into the upstream end of a first rotary cooler where the granular particles are cooled by a stream of air which enters the first cooler at about 40–110° F.; continuously removing the thus cooled granular particles from the downstream end of the first cooler; continuously passing the thus cooled granular particles to a second screen, said second screen having a duble deck with a first deck having a screen of about 6–8 mesh and a second deck having a screen of about 10–14 mesh; continuously screening said granular particles thereby to continuously obtain a second portion of fine particles which pass about a 10–14 mesh screen, a first portion of product size granules which pass about a 6–8 mesh screen and are retained on about a 10–14 mesh screen, and a second portion of oversize granular particles which are retained on about a 6–8 mesh screen; continuously recycling the second portion of fine particles to the pug mill; continuously passing the second portion of oversize particles into the upstream end of a first crusher; continuously crushing the second portion of oversize particles in the first crusher; continuously removing the thus crushed particles from the downstream end of the first crusher; continuously passing the thus crushed particles to a third screen having a single deck with about a 10–14 mesh screen therein; continuously screening the thus crushed particles to obtain a third portion of fine particles passing about a 10–14 mesh screen and a third portion of oversize particles retained on about a 10–14 mesh screen; continuously recycling the third portion of fine particles to the pug mill; continuously passing the third portion of oversize particles into the upstream end of a second crusher; continuously crushing said oversize particles in the second crusher; continuously removing the thus crushed particles from the downstream end of the second crusher; continuously recycling the thus crushed particles to the third screen; continuously passing the first portion of product size granules into the upstream end of a second cooler where the granules are further cooled by a stream of air entering the second cooler at about 40–110° F.; continuously removing the thus cooled granules from the downstream end of the second cooler; continuously passing the thus cooled granules to a fourth screen, said screen having a single deck with about a 10–14 mesh screen therein; continuously screening the thus cooled granules to obtain a fourth portion of undersize particles and a second portion of product size granules; continuously recycling the fourth portion of undersize particles to the pug mill; and continuously recovering the second portion of product size granules.

In one embodiment of the process of this invention: the atomic ratio of N:P in the ammonium phosphate slurry is about 1.3–1.4; the moisture content of said slurry is about 18–25%; a substantial portion of the particles recycled to the pug mill from the sizing and crushing steps are smaller than about 12 mesh; the stream of air entering the first drier has an inlet temperature of about 350–400° F.; the stream of air entering the second drier has an inlet temperature of about 250–400° F.; the screen in the deck of the first screen is about 12 mesh; the stream of air entering the first cooler has an inlet temperature of about 60–90° F.; the screen in the first deck of the second screen is about 8 mesh and the screen in the second deck of said second screen is about 12 mesh; the screen in the deck of the third screen is about 12 mesh; the stream of air entering the second cooler has an inlet temperature of about 60–90° F.; and the screen in the deck of the fourth screen is about 12 mesh.

In an embodiment of this invention the above-mentioned ammonium phosphate slurry is prepared by reacting an amoniating fluid selected from the group consisting of liquid anhydrous ammonia and aqueous ammonia with an aqueous solution of an acid reacting material selected from the group consisting of orthophosphoric acid, polyphosphoric acids, and sulfuric acid mixed with at least one of the aforesaid phosphoric acids in a first agitated reactor and passing the thus formed slurry to a second agitated reactor to which additional ammoniating fluid and water can be added.

In an embodiment of this invention sufficient product is recycled to the pug mill to give a recycle ratio, that is the weight ratio of recycled product to recovered product of about 3:1 to 10:1 (preferably about 5:1 to 7:1).

In an embodiment of this invention an acid reacting material selected from the group consisting of an aqueous solution of orthophosphoric acid, an aqueous solution of polyphosphoric acids, and an aqueous solution of sulfuric acid mixed with at least one of the aforesaid acids is continuously introduced into the pug mill via at least one acid sparger positioned in the pug mill beneath the rotating blades.

In an embodiment of this invention a nitrogen containing fluid selected from the group consisting of liquid anhydrous ammonia, aqueous ammonia, a nitrogen solution, and mixtures thereof is continuously introduced into the pug mill via at least one sparger positioned in the pug mill beneath the aforesaid acid sparger.

In an embodiment of this invention two pug mills are operated in parallel with each other.

In an embodiment of this invention a potash source selected from the group consisting of muriate of potash, potassium nitrate, potassium sulfate, potassium orthophosphate, potassium polyphosphate, and mixtures thereof is continuously introduced into the upper portion of the upstream end of the pug mill while, in another embodiment of this invention, such potash source, or a portion thereof, is continuously introduced into the second reactor from which said potash source is continuously passed to, or introduced into, the pug mill.

In an embodiment of this invention a phosphate source selected from the group consisting of calcium superphosphate, calcium triple superphosphate, and potassium phosphate is added to the upstream end, or portion, or part, of the pug mill.

In an embodiment of this invention dust particles escaping from the first drier, second drier, first cooler, and second cooler is recovered and recycled and ammonia escaping from the first eractor, the second reactor, the pug mill, the first drier, and the second drier is recovered and recycled.

In an embodiment of this invention dehumidified air is passed into the second cooler.

In an embodiment of this invention at least part of product size granules is coated with a conditioning agent before being passed to the storage area.

In an embodiment of this invention at least a part of the potash source is added to the second reactor.

In an embodiment of this invention two second screens are operated in parallel with each other and two first crushers are operated in parallel with each other.

One embodiment of this invention is directed to a continuous multistep process for producing fertilizer consisting essentially of ammonium phosphate granules analyzing about 11–18% N and 46–52% $P_2O_5$, the granules being free of potash values; said process comprising: preparing an ammonium phosphate slurry having a moisture content of about 15–30% by continuously reacting an ammoniating fluid selected from the group consisting of liquid anhydrous ammonia and aqueous ammonia with an aqueous solution of an acid reacting material selected from the group consisting of (i) orthophosphoric acid; (ii) polyphosphoric acids mixed with orthophosphoric acid; and (iii) sulfuric acid mixed with orthophosphoric acid in a first agitated reactor and continuously passing the thus formed slurry to a second agitated reactor to which additional ammoniating fluid and water can be added; continuously introducing the ammonium phosphate slurry and a substantial portion of particles recycled from later mentioned sizing and crushing steps into the upstream end of a pug mill; continuously withdrawing granular material from the downstream end of the pug mill while rotating the shafts and blades of siad mill; continuously passing said material into the upstream end of a rotating granulator where the granular material is smoothed by rotating in the presence of steam and hot water, thereby to produce smooth granules; continuously withdrawing the resulting smooth granules from the downstream end of the granulator; continuously passing the smooth granules into the upstream end of a first rotary drum drier where the granules are dried by rotating in the presence of a stream of air having an inlet temperature of about 300–500° F.; continuously removing the granules from the downstream end of the first drier and continuously passing the granules into the upstream end of a second rotary drier where the granules are further dried by rotating in the presence of a stream of air having an inlet temperature of about 200–500° F.; continuously removing the thus dried granules from the downstream end of the second rotary drier; continuously passing the thus dried granules to a first screen having a single deck with about a 10–14 mesh screen therein; continuously screening said granules to obtain a first portion of fine particles which pass about a 10–14 mesh screen and a first portion of oversize granular particles which are retained on about a 10–14 mesh screen; continuously recycling the thus obtained first portion of fine particles to the pug mill; continuously passing the first portion of oversize granular particles into the upstream end of a first rotary cooler where the granular particles are cooled by a stream of air which enters the first cooler at about 40–110° F.; continuously removing the thus cooled granular particles from the downstream end of the first cooler; continuously passing the thus cooled granular particles to a second screen, said second screen having a double deck with a first deck having a screen of about 6–8 mesh and a second deck having a screen of about 10–14 mesh; continuously screening said granular particles thereby to continuously obtain a second portion of fine particles which pass about a 10–14 mesh screen, a first portion of product size granules which pass about a 6–8 mesh screen and are retained on about a 10–14 mesh screen, and a second portion of oversize granular particles which are retained on about a 6–8 mesh screen; continuously recycling the second portion of fine particles to the pug mill; continuously passing the second portion of oversize particles into the upstream end of a first crusher; continuously crushing the second portion of oversize particles in the first crusher; continuously removing the thus crushed particles from the downstream end of the first crusher; continuously passing the thus crushed particles to a third screen having a single deck with about a 10–14 mesh screen therein; continuously screening the thus crushed particles to obtain a third portion of fine particles and a third portion of oversize particles; continuously recycling the third portion of fine particles to the pug mill; continuously passing the third portion of oversize particles into the upstream end of a second crusher; continuously crushing said oversize particles in the second crusher; continuously removing the thus crushed particles from the downstream end of the second crusher; continuously recycling the thus crushed particles to the third screen; continuously passing the first portion of product size granules into the upstream end of a second cooler where the granules are further cooled by a stream of air entering the second cooler at about 40–110° F.; continuously removing the thus cooled granules from the downstream end of the second cooler; continuously passing the thus cooled granules to a fourth screen, said screen having a single deck with about a 10–14 mesh screen therein; continuously screening the thus cooled granules to obtain a fourth portion of undersize particles and a second portion of product size granules; continuously recycling the fourth portion of undersize particles to the pug mill; and continuously recovering the second portion of product size granules.

In the drawing:

FIGS. I–VI constitutes a flowsheet of the process of this invention.

It is an object of this invention to provide a continuous multistep process for preparing granular mixed fertilizers.

Another object of this invention is to provide a continuous multistep process for preparing a variety of granular mixed fertilizers from conventional raw materials.

Another object of the present invention is to provide a process for the economical production of a great variety of mixed fertilizers in granular form which substantially eliminates the necessity of fertilizer production installations to invest in and maintain numerous types of fertilizer producing apparatus.

Still other objects of this invention will be readily apparent to those skilled in the art.

Conventional raw materials suitable for use in the instant process include but are not limited to: (1) orthophosphoric acid, suitably analyzing about 25–55% $P_2O_5$ and preferably wet process phosphoric acid analyzing about 50–54% $P_2O_5$; (2) polyphosphoric acid analyzing at least about 56% $P_2O_5$; (3) sulfuric acid analyzing about 73–98% $H_2SO_4$ and preferably about 90–95% $H_2SO_4$; (4) at least one nitrogen source such as ammonium nitrate; a solution of ammonium nitrate in liquid anhydrous ammonia, or in aqueous ammonia, or in water; urea; a solution of urea in liquid anhydrous ammonia, or in aqueous ammonia, or in water; ammonia, or in aqueous ammonia, or in water; ammonium sulfate or an aqueous solution thereof; liquid anhydrous ammonia; an aqueous solution of ammonia; ammonium phosphate (including $NH_4H_2PO_4$, $(NH_4)_2HPO_4$, ammonium polyphosphates, and mixtures thereof including mixtures of $NH_4H_2PO_4$ and $(NH_4)_2HPO_4$); an aqueous slurry of such ammonium phosphate; an aqueous solution of such ammonium phospate—as will be readily apparent to those skilled in the art, such ammonium phosphate is both a phosphate and a nitrogen source; (5) a potash source such as commercially available KCl analyzing about 55–63% $K_2O$ and preferably about 60–62% $K_2O$; fertilizer grade $K_2SO_4$; $KNO_3$; (6) commercial grades of superphosphate (calcium superphosphate); and (7) commercial grades of triple superphosphate (calcium triple superphosphate). Other raw materials suitable for use in the process of this invention will be readily apparent to those skilled in the art.

Among the many nitrogen sources which have given excellent results in the process of this invention are the following solutions:[1]

| | |
|---|---|
| 17–67–0 | 30–64–0 |
| 22–65–0 | 30–60–0 |
| 26–56–0 | 19–58–11 |
| 19–74–0 | 19–66–6 |
| 24–70–0 | 25–56–10 |
| 28–60–0 | 26–50–12 |
| 25–69–0 | 33–45–13 |

Other nitrogen solutions which have been used with excellent results include aqueous solutions comprising ammonium nitrate and analyzing about: (1) 54.3% ammonium nitrate; (2) 60% ammonium nitrate; (3) 83% ammonium nitrate; (4) 42.2% ammonium nitrate and 32.7% urea; (5) 44.3% ammonium nitrate and 35.4% urea: and (6) 66.8% ammonium nitrate and 16.6% ammonia. Still other nitrogen solutions which can be used with excellent results in the process of this invention will be readily apparent to those skilled in the art.

The use of fertilizers has increased steadily over the last several years and today there are many different types of fertilizers available on the market. In addition to such single fertilizers as ammonium nitrate, ammonium sulfate, urea, and the like, various fertilizers are formulated which contain nitrogen, phosphorus and potash. Many different formulations of mixed fertilizers are sold, their exact formulation depending upon the area where they are to be applied, the time of application, and the crop which is to be fertilized. Mixed fertilizers are usually expressed, designated, otherwise referred to in weight percent nitrogen as N, weight percent phosphorus as $P_2O_5$, and weight percent potassium as $K_2O$, e.g., 5–10–5 fertilizer analyzes about 5% N, 10% $P_2O_5$, and 5% $K_2O$; 9–36–18 fertilizer analyzes about 9% N, 36% $P_2O_5$, and 18% $K_2O$; and 18–46–0 fertilizer analyzes about 18% N, 46% $P_2O_5$ and zero percent $K_2O$. Granulation of fertilizer material reduces caking, decreases dustiness, provides for easier and more uniform distribution, and results in a more attractive appearance of the product. Because of these benefits farmers prefer solid fertilizers which have been granulated.

Heretofore it has generally been the practice in the fertilizer industry to produce mixed fertilizers by one of the following methods; (1) mechanically mixing separately prepared materials each of which contains a single fertilizer ingredient; (2) blending materials containing one, two, or three fertilizer ingredients; and (3) manufacturing a blended product in which particles have essentially the same composition.

Of the above-mentioned methods for production of fertilizer material, the last mentioned method is presently the most widely used by the industry. However, normally all grades cannot be made by any one of the several processes for carrying out such method, said processes consisting of: (a) ammoniating solids in rotating equipment such as pug mills with ammoniating solutions containing ammonium nitrate; (b) adding acidulating material to one or more solids in such rotating equipment and ammoniating the mixture with ammonia or ammoniating solution; (c) spraying highly concentrated solutions of salts containing one or more fertilizer ingredients into the top of prilling towers; and (d) in the case wherein mixed fertilizers of low-nitrogen content are desired, by adding ammoniating solutions to a bed of solids containing superphosphate and one or more other fertilizer ingredients in a rotary granulator.

This invention is directed to a highly versatile multistep process for the production of mixed fertilizers, whereby the variety of fertilizer grades which can be produced is significantly greater than in any of the aforementioned prior art processes.

The follwing are a few of the many grades of granular mixed fertilizer which have been prepared with excellent results by the process of this invention: 18–46–0, 18–18–18, 9–36–18, 7–28–28, 22–11–11, 13–39–13, 16–16–16, 17–17–17, 10–20–20, 6–24–12, 6–24–24, 12–12–12, and 18–46–0.

In one embodiment of this invention water, an ammoniating fluid selected from the group consisting of liquid anhydrous ammonia and an aqueous solution of ammonia, and at least one phosphoric acid selected from the group consisting of orthophosphoric acid and polyphosphoric acids, was passed into first agitated reactor 7 in such ratio as to produce a slurry having an atomic ratio of N:P of about 1.2–1.5 (preferably about 1.3–1.4) and a moisture content of about 15–30% (preferably about 18–25%). The N:P ratio was, in some instances, increased by replacing part (up to about ⅓) of the phosphoric acid with sulfuric acid thereby to adjust the N:P atomic ratio. The resulting slurry was passed via line 155, from first agitated reactor 7 to second agitated reactor 5, where additional ammonia and water could be added to further adjust the N:P ratio and the moisture content of the slurry.

The slurry was circulated continuously through slurry recycle line 6 from the bottom to the top of second reactor 5, thereby maintaining a clear pumping circuit. A sidestream was split from this pumping circuit by first flow divider 13. Said sidestream passed via line 157 to second flow divider 15 where said sidestream was divided into two substantially equal streams by said second flow divider, and the resulting streams were passed via lines 159 into the upper portions of the upstream ends of two

---

[1] In the fertilizer industry nitrogen solutions comprising ammonia, ammonium nitrate, and urea are expressed in weight percent ammonia, weight percent ammonium nitrate, and weight percent urea. Thus, 17–67–0 is about 17% ammonia, 67% ammonium nitrate, and no urea while 33–45–13 is about 33% ammonia, 45% ammonium nitrate, and 13% urea.

twin shaft pug mills 17 arranged in parallel. Simultaneously, a potash source (preferably muriate of potash analyzing about 60–62% $K_2O$) was fed into the upper portion of the upstream ends of pug mills 17; other potash sources include potassium nitrate, potassium orthophosphate, potassium polyphosphates, and potassium sulfate. Alternatively, part or all of the potash source could be fed into second reactor 5.

Acid, including orthophosphoric acid, polyphosphoric acids, and mixtures thereof, could be fed into pug mills 17 via spargers 19 (at least one such sparger in each pug mill) positioned in about the upstream one-fourth of the pug mills beneath the rotating blades of said mills. An ammonia source (e.g., liquid anhydrous ammonia, or aqueous ammonia) could be added to the pug mills via spargers 21 (at least one such sparger in each pug mill) positioned in about the upstream one-fourth of the pug mills beneath the aforesaid spargers 19. If desired, nitrogen solution could also be added through spargers 21. Where making some composition, e.g., 9–36–18 and 7–28–28, all of the acid and all, or substantially all, of the ammonia could be added to first reactor 7. If desired, additional ammonia could be added to second reactor 5 to adjust the N:P ratio. First reactor 7, second reactor 5, and pug mills 17 were covered, but they were vented to the atmosphere via exhaust lines 8, 12, and 14, respectively, first scrubber 11, and first suction means 25 (which could be a fan, a water jet, or the like), thereby to maintain a slight vacuum (e.g., a pressure of about 1–5 inches of water below ambient or atmospheric pressure) within pug mills 17, first reactor 7, and second reactor 7, and second reactor 5. Lines 8 and 14 fed into line 12 which passed exhaust air, including water vapor and ammonia, through first scrubber 11 (preferably a Venturi scrubber) where the exhaust air was contacted with acid (preferably orthophosphoric acid) or with water. The thus scrubbed air passed from first scrubber 11 to the atmosphere via line 161 and first suction means 25; the acid (or water) which had contacted the air in first scrubber 11, thereby to remove ammonia vapor from said air, was sent via line 16 to first reactor 7. An additional phosphate source selected from at least one member of the group consisting of superphosphate, triple superphosphate, ammonium phosphate (including ammonium polyphosphates), and potassium phosphate (including potassium polyphosphates) could be passed into the upper portion of the upstream ends of pug mills 17.

If desired, an additional nitrogen source selected from at least one member of the group consisting of ammonium nitrate, ammonium sulfate, ammonium phosphate, including ammonium polyphosphates, urea, and potassium nitrate could be added to (or passed into) the upper portion of the upstream ends of pug mills 17. A substantial portion of fines (particles having a mesh size less than about 10–14, preferably less than about 12), crushed and screened oversize particles, crushed product size granules, and dust recycled from later mentioned screening, crushing, and dust collecting steps were also recycled to the upper portion of the upstream ends of pug mills 17. The recycled ratio (weight ratio of recycled material to weight or product recovered) was about 3:1 to 10:1 (preferably, about 5:1 to 7:1). Hard, dense, somewhat irregular fertilizer granules were formed in pug mills 17 where the residence time was about 1½ to 2½ minutes. Product from the pug mills was fed, via a common chute (or other conveyor means) 18 to rotary drum granulator 27 where the somewhat irregular particles were converted to substantially spherically shaped particles by rotating and tumbling in the presence of moisture (saturated steam and hot water). Rotary granulator 27 was covered but it was vented to the atmosphere via exit line 22. Alternatively, a first cyclone dust collector 29 could be placed in line 22 upstream of a suction means (e.g., a fan) 31; dust from this collector could be recycled to pug mills 17. Granules from rotary granulator 27 passed via conveyor means 163 to first rotary drum drier 33 where they were partially dried by contact with directly heated air which passed through drier 33 cocurrently with the granules. Heated air for drying the granules in drier 33 passed from first air heater 35 to drier 33 via line 165. Air exit drier 33 passed via line 37 to second cyclone dust collector 39. Dust from collector 39 was recycled to pug mills 17. Air exit dust collector 39 passed via line 41 and fan 45 to second scrubber 43 where said air was scrubbed with water or acid, thereby to recover ammonia values and dust particles which passed through cyclone dust collector 39 from said air. The used scrubbing liquor passed from scrubber 43 to first reactor 7. Scrubbed air is vented to the atmosphere. Granules passed from drier 33 via conveyor means 47 to first bypass means 49. Said bypass means permitted the recycle of any portion, or oll, or none of said granules to pug mills 17. Except where using total recycle of granules to the pug mills, a portion, or all, of the granules passed via conveyor means 51 to second rotary drum drier 53 where said granules were further dried by contact with directly heated air which passed through said drier cocurrently with the granules. Air for drying said granules in drier 53 was heated in second air heater 55 from which said air passed via line 169 to drier 53. Air exit drier 53 passed via line 57 to third cyclone dust collector 59. Dust from collector 59 was recycled to pug mills 17. Air exit collector 59 passed via line 61 and fan 23 to line 41 where it was combined with air from second cyclone dust collector 39; the combined air then passed through third scrubber 43 to recover ammonia and dust particles from said air. The scrubbed air was vented to the atmosphere. Granules exit drier 53 passed via conveyor means 63 to flow divider 65 which divided the granules into two substantially equal streams which passed via conveyor means 66 to two first screens 67 arranged in parallel. Fines (particles passing about a 10–14 mesh screen, preferably about a 12 mesh screen) were recycled to pug mills 17. Oversize particles (particles retained on about a 10–14 mesh screen, preferably on about a 12 mesh screen) passed via conveyor means 69 to first rotary drum cooler 71 where said granules were cooled by contact with a countercurrent stream of air which entered the cooler at about ambient temperature. Air exit first rotary cooler 71 passer via line 73 to fourth cyclone dust collector 75. Dust collected in collector 75 was recycled to pug mills 17. Air exit collector 75 passed via line 77 and fan 20 to third scrubber 79 where said air was scrubbed with water or acid solution to recover dust particles which had passed through dust collector 75. The used scrubbing solution was sent to first reactor 7. Air exit scubber 79 was vented to the atmosphere. Granules from cooler 71 passed via conveyor means 81 to flow divider 83 which divided the flow of granules into two substantially equal streams. Said streams passed via conveyor means 85 to two second screens 87 and 87a arranged in parallel. Said second screens were double deck screens. Fines from the second screens (particles passing about a 10–14 mesh screen, preferably about a 12 mesh screen) were recycled to the pug mills. Oversize particles from second screen 87 (particles retained on about a 6–8 mesh screen, preferably on about an 8 mesh screen) passed via conveyor means 89 from said second screen to first crusher 91. Similarly, oversized particles (particles retained on about a 6–8 mesh screen, preferably an 8 mesh screen) passed from second screen 87a via conveyor means 93 to first crusher 95. Particles exit first crusher 91 passed via conveyor means 97 to single deck third screen 99. Particles exit first crusher 95 passed via conveyor means 101 to conveyor means 97 and thence to third screen 99. Fines (particles passing about a 10–14 mesh screen, preferably about a 12 mesh screen) from third screen 99 were recycled to pug mills 17. Oversized particles (particles retained on about a 10–14 mesh screen, preferably on about a 12 mesh screen) passed from third screen 99 via conveyor means 103 to second crusher 105. Product exit second crusher 105 passes via conveyor means 107 to conveyor means 97 and thence to third screen 99. Product size granules (granules passing about a 6–8 mesh screen, preferably about an 8 mesh screen, and retained on about a 10–14 mesh screen, preferably on about a 12 mesh screen) passed from second screen 87 to conveyor means 109; similar granules passed from second screen 87a via conveyor means 111 to conveyor means 109 which fed the product size granules to second bypass means 200. Said bypass means provided a means whereby any portion, or all, or none of the product size granules from screens 87 and 87a could be passed, via conveyor means 204 to third crusher 206 and thence, after being crushed in said crusher, to pug mills 17. In actual practice bypass means 200 was generally used to adjust, regulate, and control the recycle ratio (weight or recycled material:weight of product sent to the storage area). Where it was desired to increase said ratio, the quantity of product size granules passing to conveyor means 204 was increased; where it was desired to decrease said ratio, the quantity of product size granules passing to conveyor means 204 was decreased. Product size granules which were not recycled passed from second bypass means 200, via conveyor means 202 to second rotary drum cooler 113 where said granules were further cooled with a countercurrent stream of air. Said air could be ambient air or it could be dehumidified air. Air was dehumidified by conventional means such as cooling or by treating with dehumidifying agents. Where using dehumidified air, ambient air passed through dehumidifier 115 anr then via lines 117 and 118 to second rotary drum cooler 113. Said air passed through said cooler countercurrent to the flow of granules. Where using cooling to dehumifify air, moisture removed from the air was passed to the sewer. Where using dehumidifying agents, the spent agents were removed from the dehumidifier and reactivated or replaced. Granules exit cooler 113 passed via conveyor means 121 to single deck fourth screen 123. Fines from screen 123 (particles passing about a 10–14 mesh screen, preferably about a 12 mesh screen) were recycled to pug mills 17. Product size granules (granules which were retained on a 10–14 mesh screen, preferably on about a 12 mesh screen, at fourth screen 123 and which passed about a 6–8 mesh screen, preferably about an 8 mesh screen at second screens 87 and 87a) passed fourth screen 123 via conveyor means 125 to third bypass means 126. Bypass means 136 provided means whereby any portion, or all, or none of the granules fed to said bypass means could be recycled to pug mills 17. Product size granules which were not recycled via bypass means 126 passed via conveyor 127 to automatic sampling means 129 where a sample was continuously collected for analysis in the laboratory. Product size granules not collected as samples passed from said sampling means to conveyor means 131 and then to fourth bypass means 133. Said fourth bypass means permitted the sending of any portion, or all, or none of the product entering said means to totalizer scale 141 (via conveyor means 171). Product not sent directly to scale 141 from bypass means 133 passed via conveyor means 135 to rotary coating drum 137 where said product was contacted with and coated with a conventional conditioning agent such as clay, talc, mica, and the like. The coated product passed from coating drum 137 via conveyor means 139 to totalize the scale 141. Product passed from scale 141 via conveyor means 143 to a storage area. Air exit second cooler 131 passed via line 173 to fifth cyclone dust collector 175. Dust from dust collector 175 was recycled to pug mills 17. Air exit dust collector 175 passed via line 177 and fan 181 into line 77 where it was combined with air exit fourth dust collector 75. The thus combined air passed to third scrubber 79 where it is scrubbed with water or acid solution to recover dust that passed through the cyclone dust collectors. The used scrubbing solution was sent to first reactor 7. Air exit scrubber 79 was vented to the atmosphere.

The following table presents a tabulation of the temperature ranges which have been used in operating the driers and collers in the process of this invention. The broad ranges, not in parenthesis, have given excellent results; however, the somewhat narrower ranges, listed in parenthesis in the table, are those which constitute the preferred operating temperatures:

OPERATING TEMPERATURES, °F.
[Preferred temperature ranges are in parentheses]

| | First Drier | Second Drier | First Cooler | Second Cooler [1] |
|---|---|---|---|---|
| Entering Temperature of Granules | ca. 140–225 (ca. 170–205) | ca. 170–230 (ca. 180–215) | ca. 150–200 (ca. 160–180) | ca. 80–140. (ca. 100–125). |
| Exit Temperature of Granules | ca. 170–230 (ca. 180–215) | ca. 180–230 (ca. 190–220) | ca. 120–170 (ca. 100–140) | ca. 70–120. (ca. 90–105). |
| Entering Temperature of Air | ca. 300–800 (ca. 350–400) | ca. 200–500 (ca. 250–400) | ca. 40–110 (ca. 60–90) | ca. 40–110. (ca. 60–90). |
| Exit Temperature of Air | ca. 180–250 (ca. 190–220) | ca. 180–250 (ca. 200–230) | ca. 130–185 (ca. 120–160) | ca. 80–140. (ca. 90–120). |

[1] Using ambient air for cooling.

The following table presents a tabulating of the residence times which have been used in the process of this invention. The broad ranges, not in parentheses, have given excellent results; however, the somewhat narrower ranges listed in parentheses in the table are those which constitute the preferred residence times:

RESIDENCE TIMES

In first reactor:
    ca. 50–140 minutes _____ (ca. 60–90 minutes).
In second reactor:
    ca. 20–65 minutes _____ (ca. 30–45 minutes).
In pug mills:
    ca. 1–3½ minutes _____ (ca. 1½–2½ minutes).
In rotary granulator:
    ca. 2–5 minutes _____ (ca. 2–3 minutes).
In first drier:
    ca. 5–20 minutes _____ (ca. 6–12 minutes).
In second drier:
    ca. 6–20 minutes _____ (ca. 8–15 minutes).
In first cooler:
    ca. 6–20 minutes _____ (ca. 7–15 minutes).
In second cooler:
    ca. 10–30 minutes _____ (ca. 12–20 minutes).
In rotary drum coater:
    ca. 3–8 minutes _____ (ca. 5–6 minutes).

Granular material exit the downstream end of the pug mills has a temperature of about 150–220° F. (preferably about 160–200° F.) and a moisture content of about 2–8% (preferably about 2–5%). Granules exit the rotary granulator also have a temperature of about 150–235° F. (preferably about 160–200° F.) and a moisture content of about 2–8% (preferably about 2–5%).

Hot water is fed into the rotary granulator at a temperature of about 140–200° F. (preferably about 600–200° F.) and steam is fed into said granulator from a steam line at a pressure of about 30–80 p.s.i.g. (preferably about 30–45 p.s.i.g.).

The invention of this application will be better understood by referring to the following specific but nonlimiting examples. It is understood that the instant invention is not limited to these specific examples which are being offered merely as illustration and that modifications can be made without departing from the spirit and scope of the invention.

Example I.—(22-11-11)

A granular mixed fertilizer analyzing about 22% nitrogen, 11% $P_2O_5$, and 11% $K_2O$ (i.e., a 22-11-11 mixed fertilizer) was prepared by the process of this invention using the following raw materials: liquid anhydrous ammonia, wet process orthophosphoric acid analyzing about 53% $P_2O_5$, muriate of potash analyzing about 60% $K_2O$, sulfuric acid analyzing about 93% $H_2SO_4$, and an aqueous solution of ammonium nitrate analyzing about 83% $NH_4NO_3$. (As used in this example, the term ammonia will refer to the liquid anhydrous ammonia described above, the term phosphoric acid, or orthophosphoric acid, will refer to the wet process orthophosphoric acid described above, the term muriate of potash will refer to the murate of potash described above, the term sulfuric acid will refer to the sulfuric acid described above, and the term ammonium nitrate, or ammonium nitrate solution, will refer to the ammonium nitrate solution described above.)

The above-identified raw materials were used at the following rates per ton of product: ammonia, 197 lbs.; phosphoric acid, 416 lbs.; muriate of potash, 367 lbs.; sulfuric acid, 285 lbs.; and ammonium nitrate solution, 1,010 lbs.

Ammonia, 161 lbs. per ton of product; phosphoric acid, 416 lbs. per ton of product; and sulfuric acid, 285 lbs. per ton of product and water at such rate as to yield a slurry having the desired moisture content (in this instance about 18–20% mositure) were fed into a first agitated reactor to form a slurry comprising ammonium phosphate, ammonium sulfate, and water. This slurry flowed as a first stream from said first reactor to a second agitated reactor, at substantially the same rate that raw materials, including water, were fed into the first reactor. Said slurry was pumped continuously through a slurry recycle line from the bottom to the top of said second reactor, thereby maintaining a clear pumping circuit. A sidestream substantially equivalent to the volume of the aforesaid first stream was split from said pumping circuit by a first flow divider and passed to a second flow divider. Said sidestream was divided, by the second flow divider, into two substantially equal streams, and the resulting streams were passed into the respective upper portions of the upstream ends of two twin shaft pug mills arranged in parrallel. Simultaneously, the aforesaid muriate of potash was fed into the upper portions of the upstream ends of the aforesaid pug mills at the rate of 367 lbs. of said muriate of potash per ton of product. While mixing the above named materials in the pug mills, ammonia, 36 lbs. per ton of product, and ammonium nitrate, 1,010 lbs. per ton of product, were fed into the pug mills via spargers positioned beneath the pug mills' blades and extending into about the upstream one-fourth of said mills. There were two such spargers in each pug mill.

The first reactor, second reactor, and pug mills were covered, but each was vented to the atmosphere via an exhaust line which communicated with the atmosphere via a first scrubber and a suction source. In this instance, a suction producing jet was used; however, other suitable suction sources including exhaust fans will be readily apparent to those skilled in the art. Acid, usually wet process orthophosphoric acid analyzing about 53% $P_2O_5$, was passed through the first scrubber to remove ammonia from the gas passing through said scrubber. In this instance a Venturi type scrubber was used; however, other suitable scrubbers, including towers, will be readily apparent to those skilled in the art. Used scrubbing solution from the first scrubber was recycled into the first reactor. Product from later mentioned dust recovering, screening, and crushing steps was recycled to the upper portions of the upstreams ends of the pug mills at a rate sufficient to maintain a "workable mass," as distinct from a thin slurry or a "dry mass," in the pug mills. Experience has shown that a "workable mass" is maintained in the pug mills where product exit the downstream end of said mills contains about 2–8% moisture. Above this moisture content the material in the pug mills was too wet to work effectively and below this moisture content the material in the pug mills was too dry to work effectively (i.e., it constituted a "dry mass"). The recycled material comprised dust collected in dust collectors, fines from screening operations, crushed and screened oversize product, plus such quantity of product size granules as was necessary to crush and recycle to maintain a workable mass in the pug mills. An excellent workable mass was maintained in the pug mills, where making granular 22–11–11 fertilizer, according to the procedure of this example, by maintaining a recycle ratio of about 8:1. Substantially all of the recycled product passed an 8 mesh screen, and most of it passed a 12 mesh screen.

Hard, dense, somewhat irregular fertilizer granules, analyzing about 4–6% moisture and having an exit temperature of about 175° F. were formed in the pug mills where the residence time was about 1½ to 2½ minutes. Said granules passed via a common chute to a rotary drum granulator where the somewhat irregular particles were converted to substantially spherically shaped granules or granular particles by rotating and tumbling in the presence of sufficient moisture (saturated steam and hot water) to accomplish such conversion. Said granulator was covered, but it was vented to the air via an exhaust line. Provision was made to put a first cyclone dust collector and suction means (fan or jet) in the exhaust line; however, this was not necessary, because substantially no dust was formed in the granulator.

Granules from the aforesaid rotary granulator passed to a first rotary drum drier where said granules were partially dried by contact with directly heated air which passed through the drier cocurrently with the granules. Granules exit the granulator analyzed about 4–5% moisture, and those exit the first rotary dier analyzed about 1.5–2% moisture. Granules entering the first drier had a temperature of about 170° F. and those leaving said drier had a temperature of about 185° F. Air entering the first drier had a temperature of about 350–380° F. and air exit the first drier had a temperature of about 200° F. Air exit the first drier passed through a second cyclone dust collector. Dust collected in said collector was recycled to the pug mills. Air exit the second dust collector passed via an exit line and a fan to a second scrubber where said air was scrubbed with water to recover ammonia values and fine dust particles therefrom. The thus scrubbed air was vented to the atmosphere. The used scrubbing liquor was fed into the first reactor.

The second scrubber was a tower type scrubber. (As will be readily apparent to those skilled in the art, other types of scrubbers, e.g., a Venturi scrubber or a tube type scrubber, could be used in place of the tower. Also, the fan could be placed after the second scrubber, or the fan could be replaced by a suction means, e.g., a jet placed after the second scrubber. The comments made in this paragraph are applicable to all combinations of such means and scrubbers used in this process. Also, as will be readily apparent to those skilled in the art, one large fan, or jet, or other suction means can be used to draw air through the first drier, second drier, first cooler, and second cooler by connecting the exhaust lines from these drying and cooling devices to a common vent leading to the aforesaid large fan, jet, or other suction means; if such an arrangement were used, it would be desirable to place the fan, and necessary to place a jet or similar suction source, downstream of the scrubber, or scrubbers, used to scrub the exhaust air from the aforementioned drying and cooling devices.)

Provision was made (via a first bypass means) to recycle any portion, or all, or none, of the granules exit the aforesaid first drier to the upper portion of the upstream ends of the pug mills. Granules exit the first bypass means, except those recycled to the pug mills via the first bypass means, passed to a second rotary drier where said granules were further dried by contact with directly heated air which passed through said second drier cocurrently with the granules. Granules entering the second drier analyzed about 1.5–2% moisture and granules leaving said drier analyzed about 0.75–0.85% moisture. Granules entered the second drier at about 185° F. and left said drier at about 190° F. Air entered said drier at about 300 F. and left said drier at about 220° F. Air exit the second drier passed through a third cyclone dust collector. Dust from said collector was recycled to the upper portion of the upstream ends of the pug mills. Air exit the third cyclone dust collector, after passing through a fan, was combined with air exit the fan downstream of the aforesaid second cyclone dust collector and passed through the aforesaid second scrubber to recover ammonia values and fine dust particles therefrom. The thus scrubbed air was vented to the atmosphere, and the used scrubbing solution was fed into the first reactor.

Granules exit the second drier were divided into two substantially equal streams by a flow divider. Each stream passed to a single deck screen (two screens arranged in parallel). Fine particles (particles passing a 12 mesh screen) were recycled to the upper portion of the upstream ends of the pug mills. The two streams of oversized particles (particles retained on a 12 mesh screen) were combined and passed via a conveyor means (a common chute) to a first rotary drum cooler where said granules were cooled by contact wiith a countercurrent stream of air which entered said cooler at about ambient temperature (ca. 50–90° F.). Air left the first cooler at about 160–170° F. Granules entered the first cooler at about 170° F. and left said cooler at about 140° F. Granules entering said cooler analyzed about 0.7% moisture, and granules exit said cooler analyzed about 0.6% moisture. Air exit the first cooler passed through a fourth cyclone dust collector. Dust collected in said collector was recycled to the pug mills. Air exit the fourth cyclone dust collector, passed via an exit line and a fan to a third scrubber where said air was scrubbed with water to recover fine dust particles therefrom. The thus scrubbed air was vented to the atmosphere and the scrubbing liquor was fed into the first reactor. The third scrubber was a tower type scrubber. Granules exit the first rotary cooler were divided into two substantially equal streams by a divider. These streams passed to two double deck second screens arranged in parallel. Fines (particles passing a 12 mesh screen) were recycled to the pug mills. Oversized particles (particles retained on an 8 mesh screen) passed to two first crushers. These crushers were arranged in parallel and one crusher received all of the oversize particles from one of the second screens while the other crusher received all of the oversize particles from the other second screen. Product exit said two first crushers was combined and passed to a third screen. Said third screen was a single deck screen. Fines (particles passing a 12 mesh screen) from the third screen were recycled to the pug mills. Oversized particles (particles retained on a 12 mesh screen) from the third screen passed to a second crusher. Crushed particles exit the second crusher were recycled to the third screen.

Product sized particles (granules passing an 8 mesh screen and retained on a 12 mesh screen) were passed from the second screen to a second bypass means which provided means for sending any portion, or all, or none, of the product size particles or granules to a third crusher. Crushed product exit the third crusher was recycled to the pug mills. Granules exit the second bypass means, except those sent to the third crusher, passed to a second rotary drum cooler were said granules were further cooled with a countercurrent stream of air which entered the cooler at ambient temperature (ca. 50–90° F.). Granules entered the second cooler at about 125° F. and left said cooler at about 95° F., and air leaving the aforesaid second cooler had a temperature of about 120° F. Granules entering said second cooler had a moisture content of about 0.5–0.6% and granules exit said cooler had a moisture content of about 0.5–0.6%. Air exit said second cooler passed through a fifth cyclone dust collector, and dust collected therein was recycled to the upper portion of the upstream ends of the pug mills. Air exit said collector, after passing through a fan was combined with air exit the downstream end of the fan downstream of the aforesaid fourth cyclone dust collector and passed through the aforesaid third scrubber to recover fine dust particles. The thus scrubbed air was vented to the atmosphere, and the used scrubbing solution was fed into the first reactor. Granules exit the second cooler passed to a fourth screen having single deck with a 12 mesh screen therein. Fines (particles passing a 12 mesh screen) were recycled from the fourth screen to the pug mills.

Product size granules (granules passing the 8 mesh screens of the aforesaid second screens and retained on the 12 mesh screen of the fourth screen) were sent to a third bypass means which permitted any portion, or all, or none, of the granules entering said bypass to be recycled to the pug mills. Product not recycled to the pug mills by the third bypass passed through an automatic sampling means where a representative sample was collected for analysis in the laboratory. Product not collected as sample passed from the sampling means to a rotary coating drum where the particles were coated with about 1–3% clay. The thus coated particles passed to a totalizer scale and thence to a storage area. An analysis of the thus coated product showed that it was a high quality 22–11–11 mixed fertilizer consisting of nearly spherical granules within the size range of about −8 to +12 mesh.

Example II.—(9–36–18)

A 9–36–18 mixed fertilizer was prepared according to the general procedure of Example I. However, in this instance all of the raw materials except the muriate of potash, which was added to the pug mills, were added to the first reactor, and no ammonium nitrate solution was used.

The ammonia, orthophosphoric acid, muriate of potash, and sulfuric acid were of the same grade and analysis as those used in Example I. The quantities of raw material per ton of product were: ammonia, 226 lbs.; orthophosphoric acid, 1359 lbs.; muriate of potash, 600 lbs.; sulfuric acid, 37 lbs. Sufficient water was continuously added to the first reactor to yield a slurry having a moisture content of about 18–20%. Product from the dust collecting, screening, and crushing steps was recycled to the pug mills at such rate as to maintain a recycle ratio of about 7:1. Substantially all of the recycled material passed an 8 mesh screen and most of this material passed a 12 mesh screen.

Example III.—(7–28–28)

A 7–28–28 mixed fertilizer was prepared by the general method of Example I. In this instance neither sulfuric acid nor ammonium nitrate solution were used and all of the raw materials except the muriate of potash, which was added to the pug mills, were added to the first reactor. The grade and analysis of the raw materials were the same as those listed in Example I. The quantities of raw materials per ton of product were: ammonia, 175 lbs.; orthophosphoric acid, 1,057 lbs.; muriate of potash, 934 lbs. Sufficient water was continuously added to the first reactor to yield a slurry having a moisture content of about 18–20%. Product from the dust collecting, screening, and crushing steps was recycled to the pug mills at such rate as to maintain a recycle ratio of about 5:1. Substantially all of the recycled material passed an 8 mesh screen and most of this material passed a 12 mesh screen.

Example IV.—(13–39–13)

A 13–39–13 mixed fertilizer was prepared by the general procedure of Example I. However, in this instance no ammonium nitrate solution was used, and the product size granules were not coated. Said granules bypassed the coating means and passed from the fourth bypass means to the totalizer scale and thence to the storage area.

The raw materials were the same grade and analysis as those used in Example I. The quantities of raw materials per ton of product were: ammonia, 328 lbs.; orthophosphoric acid, 1,472 lbs.; muriate of potash, 434 lbs.; sulfuric acid, 36 lbs.

Orthophosphoric acid 1,472 lbs. per ton of product; sulfuric acid, 36 lbs. per ton of product; and ammonia, 243 lbs. per ton of product were added to the first reactor. Water was continuously added to the first reactor at such rate as to yield a slurry analyzing about 21–24% moisture. Muriate of potash, 434 lbs. per ton of product, was added to the second reactor, and the remainder of the ammonia, 85 lbs. per ton of product was added to the pug mills via spargers extending into about the upstream one-fourth of mills beneath the rotating blades. The recycle ratio was about 3:1.

Example V.—(18–18–18)

An 18–18–18 mixed fertilizer was prepared by the general method of Example I. The grades and assays of the raw materials were substantially the same as those of the corresponding materials used in Example I. The quantities of these raw materials used per ton of product were: ammonia, 187 lbs.; orthophosphoric acid, 680 lbs.; muriate of potash, 600 lbs.; sulfuric acid, 44 lbs.; ammonium nitrate solution, 746 lbs.

The quantities of raw material added to the first reactor per ton of product were: orthophosphoric acid, 680 lbs.; sulfuric acid, 44 lbs.; ammonia, 127 lbs. Water was continuously added to the first reactor at such rate as to yield a slurry analyzing about 22–25% moisture. The remainder of the ammonia and all of the muriate of potash were added to the pug mills. Product from the dust collecting, screening, and crushing steps was recycled to the pug mills at such rate as to maintain a recycle ratio of about 7:1. Substantially all of the recycled material passed an 8 mesh screen and most of this material passed a 12 mesh screen.

Example VI.—(6–24–24)

A 6-24-24 mixed fertilizer was prepared by the general procedure of Example I.

The raw materials used per ton of product were: orthophosphoric acid (54.3% $P_2O_5$), 305 lbs.; liquid anhydrous ammonia, 96 lbs.; nitrogen solution (19% $NH_3$, 74% $NH_4NO_3$, 7% $H_2O$; 41% N), 105 lbs.; superphosphate (19.7% available $P_2O_5$), 127 lbs.; triple superphosphate (46% available $P_2O_5$), 650 lbs.; and muriate of potash (60.5% $K_2O$), 793 lbs.

Available $P_2O_5$ was determined according to the method given on pages 10 and 11 of the Eighth edition of "Official Methods of Analysis of the Association of Official Agricultural Chemists."

The quantities of the above-described raw materials added to the first reactor were: orthophosphoric acid, 305 lbs. per ton of product; ammonia, 48 lbs. per ton of product. Water was continuously added to the first reactor at such rate as to yield a slurry analyzing about 20–23% moisture.

The remainder of the ammonia and all of the nitrogen solution were added to the pug mills via the spargers described supra. All of the superphosphate, all of the triple superphosphate, and all of the muriate of potash were added to the upper portion of the upstream ends of the pug mills.

Product, most of which passed a 12 mesh screen, and substantially all of which passed an 8 mesh screen was recycled to the pug mills at such rate as to provide a recycle ratio of about 3:1.

Example VII.—(22–11–11)

A granular 22–11–11 fertilizer was prepared by the general procedure of Example I. However, in this instance about ⅓ of the muriate of potash was fed into the second reactor and about ⅔ of said muriate was fed into the pug mills.

Example VIII.—(7–28–28)

A granular 7–28–28 fertilizer was prepared by the general procedure of Example III. In this instance the quantities and grades of raw materials used were substantially identical to those used in Example III. The recycle ratio was about 5:1, and water was added to first reactor at such rate as to yield a slurry having a moisture content of about 19–21%. However, the procedure of Example III was modified by adding about 5% of the phosphoric acid and about 5% of the ammonia to the pug mills via spargers positioned in about the upstream one-fourth of the pug mills beneath the rotating blades. Each pug mill had one acid sparger and two ammonia spargers. The ammonia spargers were positioned beneath the acid spargers.

Example IX.—(9–36–18)

A 9–36–18 mixed fertilizer was prepared according to the general method of Example II. However, in this instance about 5 lbs. of the ammonia per ton of product and about 2–5 gals. of water per ton of product were added to the second reactor.

Example X.—(9–36–18)

A 9–36–18 mixed fertilizer was prepared by the general procedure of Example II; however, in this instance about 2–5 gals. of water per ton of product was added to the second reactor.

Example XI.—(9–36–18)

The granular mixed 9–36–18 fertilizer of Example II was prepared by the general procedure of Example II. However in this instance about 5 lbs. of the ammonia per ton of product was added to the second reactor.

Example XII.—(7–28–28)

A 7–28–28 mixed granular fertilizer was prepared according to the general procedure of Example III. However, in this instance the procedure was modified by replacing about 20% of the orthophosphoric acid (on the basis of $P_2O_5$ content) with polyphosphoric acid analyzing about 70% $P_2O_5$.

Example XIII.—(18–46–0)

A granular 18–46–0 fertilizer comprising ammonium phosphate was prepared by the general procedure of Example I. However, in this intsance no potash source was used, and the raw materials were: wet process phosphoric acid analyzing about 54% $P_2O_5$, sulfuric acid analyzing about 93% $H_3PO_4$, liquid anhydrous ammonia, and water. The quantities of these materials per ton of product were: ammonia, 450 lbs.; orthosphosphoric acid, 1713 lbs.; and sulfuric acid, 84 lbs. Sufficient water was continuously added to the first reactor to yield a slurry having a moisture content of about 18–20%. All of the raw materials except about 100 lbs. of the ammonia per ton or product (which was added to the pug mills via ammonia spargers positioned in about the upstream one-half of these mills beneath the rotary blades) were added to the first reactor. The recycle ratio was about 7:1. The product comprised substantially spherical fertilizer granules analyzing about 18% N and 46% $P_2O_5$; it did not contain $K_2O$ values.

Substantially identical results were obtained where using furnace grade orthophosphoric acid as a source of $P_2O_5$ values and where using aqueous ammonia as a source of N values.

Substantially identical results have been obtained where adding a part of the ammonia (e.g., ca. 3–5 lbs. of ammonia per ton of product) and a part of the water (e.g., ca. 2–5 gals. of water per ton of product) to the second agitated reactor tank.

Substantially identical results were also obtained where adding a portion (e.g., about 4–5% or more) of the acid to the pug mills via acid spargers positioned in about the upstream one-half of these mills beneath the rotary blades and above the ammonia spargers. Where adding a portion of the acid to the pug mills, the quantity of ammonia added to said mills was increased in proportion to the amount of the acid fed into the mills.

The nitrogen content of fertilizers prepared by the ammoniation of mixtures of phosphoric and sulfuric acids can be adjusted by changing the relative proportions of sulfuric acid and phosphoric acid in the acid mixtures. Increasing the proportion of sulfuric acid will increase the N assay of such fertilizer and decrease the $P_2O_5$ assay thereof. Increasing the proportion of phosphoric acid, or omitting the sulfuric acid, will increase the $P_2O_5$ assay and lower the N assay. Other granular fertilizers comprising ammonium phosphate which have been prepared in excellent yield by the method of this invention include 13–52–0 and 11–48–0. Such fertilizers were prepared by the ammoniation of othrophosphoric acid in the absence of sulfuric acid. Excellent results have also been obtained were part (e.g., 2–5% or more) of the orthophosphoric acid was replaced with polyphosphoric acids. Other granular fertilizers comprising ammonium phosphate which can be prepared by the process of this invention will, as a consequence of this disclosure, be readily apparent to those skilled in the art.

As used herein the term "percent" (%) means percent by weight, unless otherwise defined where used, the term "parts" means parts by weight, unless otherwise defined where used, and the terms "mesh" and "screen size" refer to U.S. Standard mesh or screen size, unless otherwise defined where used. The term "recycle ratio" means the ratio of parts of product recycle:parts of product recovered.

The automatic sampling means used in the process of this invention can be either a moving machine sampler or a stationary machine sampler. It is generally preferred to use a moving machine sampler.

As will be readily apparent to those skilled in the art, the moving parts (e.g., agitators, pug mill shafts, rotary drums, pumps, fans, etc.) will move, operate, or function where conducting the process of this invention.

In the process of this invention, liquids, slurries, and gases, including dust-laden gases, can be conveyed in lines, mains, conduits, ducts, pipes, and the like. Liquids and slurries can also be conveyed, during gravity-driven flow or for short distances after exit from a pump, in open (or uncovered) chutes, troughs, and the like.

In the process of this invention, solids, including granules, pulverulent material, and crystalline material, can be conveyed in chutes, vibrating chutes, screw conveyors, pneumatic conveyors, elevators, including pneumatic and bucket, or cup type elevators, belt conveyors, bucket, or cup type conveyors, and the like.

Bypass and flow dividing means suitable for use with solids in the process of this invention include: (a) overflow bins having means for varying or controlling the amount of overflow discharged therefrom; (b) overflow bins having means for varying or controlling the amount of underflow discharged therefrom; (c) Y's having their arms positioned downstream with dampers for varying or controlling flow positioned therein; and (d) two leg chutes with movable flow spreaders between the legs. Other bypass and flow dividing means suitable for use with solids in the process of this invention will be readily apparent to those skilled in the art.

Bypass and flow dividing means suitable for use with liquids and slurries in the process of this invention include: (a) Y's having their arms positioned downstream with valves for varying or controlling flow positioned therein or communicating therewith; (b) T's having valves for varying or controlling flow positioned in or communicating with the downstream arms thereof; and (c) weir boxes positioned to receive discharge from pipes, lines, conduits, chutes, and the like, said boxes having two discharge ports or positions with means for controlling or varying the rate of discharge from said ports or positions. Other bypass and flow dividing means suitable for use with liquids and slurries will be readily apparent to those skilled in the art.

Crushers which can be used in the process of this invention include ball mills, chain mills, rod mills, rollers, and the like; still other types of crushers which can be used in the process of this invention will be readily apparent to those skilled in the art.

Where desired, pumps (e.g., centrifugal pumps, slurry pumps, air motivated pumps, and the like) can be used to pump liquids or slurries in the process of this invention. Where practical (i.e., where passing a liquid or slurry from a higher level to a lower level) gravity induced flow can be used in the process of this invention.

Spargers can be perforated pipes projecting into the pug mills, block spargers positioned in the bottoms of said mills, or perforations in the bottoms of the pug mills, said spargers communicating with at least one source of ammonia or fertilizer solution, or acid reacting liquid (e.g., a phosphoric acid solution or a mixture of phosphoric and sulfuric acids), other types of spargers suitable for use in the process of this invention will be readily apparent to those skilled in the art.

In the process of this invention, either direct or indirect heating can be used to heat air for drying product in the first and second driers; however, it is generally preferred to use direct heating.

In the process of this invention, heated air can be passed through either or both of the driers in countercurrent or in cocurrent flow (based on the direction of flow of product); however, cocurrent flow is generally preferred.

In the process of this invention, cooling air can be passed through either or both of the coolers in countercurrent or cocurrent flow (based on the direction of flow of product); however, countercurrent flow is generally preferred.

Although twin shaft pug mills are generally preferred in the process of this invention, excellent results have been obtained with single shaft pug mills.

What is claimed is:

1. A process for preparing granular mixed fertilizer, said process comprising:
  (a) granulating a mixture in a pug mill, said mixture consisting essentially of; (i) ammonium phosphate slurry having an atomic N:P ratio of about 1.2–1.5:1 and containing about 15–30% moisture; (ii) a potash source selected from the group consisting of $KCl$, $KNO_3$, $K_2SO_4$, $K_3PO_4$, and potassium polyphosphates; and (iii) granules recycled from later mentioned recycling steps;
  (b) converting granules from the pug mill to smooth granules in a rotary granulator;
  (c) drying the smooth granules in a first rotary dryer with an air stream having an inlet temperature of about 300–800° F.;
  (d) drying granules from the first dryer in a second rotary dryer with an air stream having an inlet temperature of about 200–500° F.;
  (e) screening granules from the second dryer with a first, single deck, about 10–14 mesh screen to obtain; (i) a first portion of fine granules; and (ii) a first portion of oversize granules, and recycling the fine granules to the pug mill;
  (f) cooling the oversize granules in a first rotary cooler with an air stream having an inlet temperature of about 40–110° F.;

(g) screening granules from first cooler with a second screen having a first deck with about a 6–8 mesh screen and a second deck with about a 10–14 mesh screen to obtain; (i) a second portion of fine granules passing about a 10–14 mesh screen; (ii) a second portion of oversize granules retained on about a 6–8 mesh screen; and (iii) a first portion of product size granules passing about a 6–8 mesh screen and retained on about a 10–14 mesh screen, and recycling the second portion of fine granules to the pug mill;

(h) crushing the second portion of oversize granules in a first crusher, and screening the crushed granules with a third, single deck, about 10–14 mesh screen to obtain; (i) a third portion of fine granules; and (ii) a third portion of oversize granules, and recycling the third portion of fine granules to the pug mill;

(i) crushing the third portion of oversize granules in a second crusher, and recycling granules from the second crusher to the third screen;

(j) cooling the first portion of product size granules in a second rotary cooler with an air stream having an inlet temperature of about 40–110° F.;

(k) screening the granules from the second cooler with a fourth, single deck, about 10–14 mesh screen to obtain; (i) a fourth portion of undersize granules; and (ii) a second portion of product size granules, and recycling the fourth portion of undersize granules to the pug mill; and (l) recovering the second portion of product size granules.

2. The process of claim 1 in which;
(a) the atomic ratio of N:P in the ammonium phosphate slurry is about 1.3–1.4:1;
(b) the moisture content of said slurry is about 18–25%;
(c) the stream of air entering the first drier has an inlet temperature of about 350–400° F., and the stream of air entering the second drier has an inlet temperature of about 250–400° F.;
(d) the stream of air entering the first cooler has an inlet temperature of about 60–90° F., and the stream of air entering the second cooler has an inlet temperature of about 60–90° F.;

3. A process for preparing granular mixed fertilizer, consisting essentially of ammonium phosphate analyzing about 11–18% N and 46–52% $P_2O_5$ and being free of potash, said process comprising:

(a) granulating a mixture in a pug mill, said mixture consisting essentially of ammonium phosphate slurry having a moisture content of about 15–30% and granules recycled from later mentioned recycling steps;

(b) converting granules from the pug mill to smooth granules in a rotary granulator;

(c) drying said smooth granules in a first rotary drier with an air stream having an inlet temperature of 300–500° F.;

(d) drying granules from the first rotary drier in a second rotary drier with an air stream having an inlet temperature of 200–500° F.;

(e) screening granules from the second rotary drier with a first single deck screen of about 10–14 mesh to obtain (i) a first portion of fine granules; and (ii) a first portion of oversize granules, and recycling the fine granules to the pug mill;

(f) cooling said first portion of oversize granules in a first rotary cooler with an air stream having an inlet temperature of about 40–110° F.;

(g) screen the thus cooled granules with a second double deck screen having a first deck of about 6–8 mesh and a second deck of about 10–14 mesh to obtain (i) a second portion of fine granules passing about a 10–14 mesh screen; (ii) a second portion of oversize granules retained on about a 6–8 mesh screen; and (iii) a first portion of product size granules passing about a 6–8 mesh screen and retained on about a 10–14 mesh screen, and recycling the second portion of fine granules to the pug mill;

(h) crushing the second portion of oversize granules in a first crusher;

(i) screening the thus crushed granules with a third single deck screen of about 10–14 mesh to obtain (i) a third portion of fine granules and (ii) a third portion of oversize granules, and recycling the fine granules to the pug mill;

(j) crushing the third portion of oversize granules in a second crusher, and recycling granules from the second crusher to the third screen;

(k) cooling said first portion of product size granules in a second rotary cooler, with an air stream having an inlet temperature of about 40–110° F.;

(l) screening the thus cooled granules with a fourth single deck screen of about 10–14 mesh to obtain (i) a fourth portion of undersize granules and (ii) a second portion of product size granules, and recycling the fourth portion of fine granules to the pug mill;

(m) recovering the second portion of product size granules.

References Cited

UNITED STATES PATENTS 2,798,801   7/1957   Kieffer et al. _____ 71—64

OTHER REFERENCES

Martinet, J. S.: "Continuous Granular Fertilizer Production," in Agricultural Chemicals, vol. 9, April 1954, pp. 46–48; S 583 A3.

Sauchelli, V.: Chemistry and Technology of Fertilizers, Reinhold (N.Y.), 1960; pp. 275, 282–284, 507; TP 963 52.

S. LEON BASHORE, *Acting Primary Examiner.*

T. D. KILEY, R. BAJEFSKY, *Assistant Examiners.*